(12) United States Patent
Drew et al.

(10) Patent No.: US 7,786,851 B2
(45) Date of Patent: Aug. 31, 2010

(54) DATA ACQUISITION AND DISPLAY SYSTEM FOR MOTOR VEHICLE

(75) Inventors: Michael Drew, Dexter, MI (US); Brian Herron, Dexter, MI (US)

(73) Assignee: Drew Technologies, Ann Arbor, MI (US)

( * ) Notice: Subject to any disclaimer, the term of this patent is extended or adjusted under 35 U.S.C. 154(b) by 311 days.

(21) Appl. No.: 11/836,672

(22) Filed: Aug. 9, 2007

(65) Prior Publication Data

US 2009/0040034 A1 Feb. 12, 2009

(51) Int. Cl.
- B60Q 1/00 (2006.01)
- G01M 17/00 (2006.01)
- G09G 5/00 (2006.01)

(52) U.S. Cl. .................. 340/438; 340/439; 340/440; 340/441; 340/449; 340/450; 340/451; 340/453; 340/459; 340/462; 701/29; 701/30; 701/31; 701/32; 701/33; 701/34; 701/35; 345/1.1; 345/1.2; 345/1.3

(58) Field of Classification Search ......... 340/438–454, 340/459–462; 701/29–35; 345/1.1–1.3
See application file for complete search history.

(56) References Cited

U.S. PATENT DOCUMENTS

| 5,819,201 | A | 10/1998 | DeGraaf | |
|---|---|---|---|---|
| 6,667,726 | B1 * | 12/2003 | Damiani et al. | 345/1.1 |
| 6,690,268 | B2 * | 2/2004 | Schofield et al. | 340/438 |
| 6,919,822 | B2 * | 7/2005 | Tanaka et al. | 340/932.2 |
| 7,012,727 | B2 * | 3/2006 | Hutzel et al. | 359/265 |
| 7,116,216 | B2 * | 10/2006 | Andreasen et al. | 340/438 |
| 7,184,887 | B2 | 2/2007 | Wood et al. | |
| 7,257,468 | B1 * | 8/2007 | Costa et al. | 701/1 |
| 7,382,237 | B2 * | 6/2008 | Stoschek et al. | 340/438 |
| 2002/0049538 | A1 | 4/2002 | Knapton et al. | |
| 2006/0271246 | A1 | 11/2006 | Bell et al. | |
| 2007/0032950 | A1 | 2/2007 | O'Flanagan et al. | |
| 2007/0124043 | A1 | 5/2007 | Ayoub et al. | |
| 2007/0185627 | A1 | 8/2007 | Mavreas | |

* cited by examiner

*Primary Examiner*—Benjamin C Lee
*Assistant Examiner*—Lam P Pham
(74) *Attorney, Agent, or Firm*—McHale & Slavin, P.A.

(57) ABSTRACT

The present invention is directed toward a data acquisition and display system for vehicles that connects to the vehicle's on-board computer(s) via a data link connector (DLC). The system includes a display module suitable for permanent or temporary attachment within the interior of a vehicle. The display module preferably includes a full color monitor that also functions as a touch screen for inputting commands to the computer within the display module. The computer includes a suitable processor, operating system, software and tangible data storage media to allow multiple user configurable functions. The display module collects information from the vehicle via multiple busses and senders through the data link connector and displays the information on the screen of the display module in a user configured graphics format. The direct connection between the display module and the data link facilitates bi-directional communication with the vehicle's on-board computer(s) for diagnostics as well as reprogramming of the on-board computer(s) which may be accomplished in real-time.

20 Claims, 13 Drawing Sheets

DATA ACQUISITION AND DISPLAY SYSTEM FOR MOTOR VEHICLE

FIELD OF INVENTION

The present invention generally relates to a display device for use in a motor vehicle and more particularly to a digital display system that integrates with the vehicle's on-board computer as well as peripheral devices for acquisition and display of information in a user configurable format.

BACKGROUND INFORMATION

An instrument panel provides a variety of functions within a vehicle. Gauges mounted within the panel are the primary interface between the driver and the vehicle. For example, a speedometer indicates the speed of the vehicle; a tachometer shows the rotational speed of the engine; while other gauges monitor and show engine temperature, fluid levels and various other parameters.

Typically in a vehicle, a factory installed instrument panel is designed to present a particular arrangement, e.g. a cluster of gauge-type instruments in a pre-set design. These instruments generally include sensors or senders positioned at appropriate points within the vehicle. Each sensor monitors one of numerous parameters and electrically or mechanically transmits a proportional output to an associated instrument. A needle or pointer is mounted on the rotary output shaft of a gauge motor and assumes different positions based on the control signal received by the instrument. The needle is positioned near a display bearing markings relevant to the condition being measured, and the needle points to various indicia as it turns. For example, if the gauge is part of a speedometer, the indicia on the gauge display will indicate various rates of speed in miles or kilometers per hour.

Accurate readings of the factory installed instruments often require the driver to divert attention from the road for extended time periods. Steering wheel or seat positioning may cause a portion of the gauges to become obstructed from clear view extending the time it takes a driver to accurately read a cluster of instruments. Because many of the instruments must be read while the vehicle is in motion, the time required to complete a reading of the instruments may create a dangerous situation. A vehicle traveling at 60 miles per hour moves 88 feet per second, thus a driver takes his eyes off the road for 88 feet every second he/she diverts their attention to the instrument panel.

An instrument panel also functions as a key component to the interior design of a vehicle. Through the selection of surface material and contour as well as types of displays, backlighting and switches, the instrument panel can change the personality of a vehicle. Vehicle owners often install aftermarket gauges to enhance the attributes of the vehicle, either for actual performance measurement or to dress-up the vehicle for competition. Competition has always been popular among car enthusiasts and has included contests of speed, endurance, detailing, etc., each of which require the vehicle to assume a different personality.

Aftermarket gauges are mounted in various positions within the passenger compartment of the vehicle generally within peripheral view of the driver. Often the aftermarket gauges are mounted in groups or clusters within gauge pods on the A-pillar of the vehicle or within gauge cups or panels mounted on top or under the dash of the vehicle. The cluster mounts allow the driver to view multiple gauges in a single glance. One common type of gauge, often called a panel meter gauge, is housed in a small cylindrically shaped housing having a lens at one end and lead-in terminals at the other end. The housings are generally available in various standard diameters, with 2 1/16" and 2 5/8" being the most popular. The standard diameters of the gauge housings correspond to apertures provided in the gauge pods, cups and panels to allow the instrument panels to be customized according to the vehicle owner's preference. However, once the gauge layout and theme are chosen and installed, a change requires replacement and/or reconnection of the gauges.

Generally, the aftermarket gauges are connected in one of two ways. In the first, the car enthusiast locates the correct wiring and splices the new gauge wiring into the existing sensor wiring. Locating the correct wires and following them to a convenient splice point is a difficult task and requires knowledge, time, patience, and skill that some individuals simply do not have. Moreover, this greatly complicates the task of writing comprehensive instructions because many models and makes of automobiles require individually tailored instructions to account for differences in vehicle configurations. In addition, if the splice is not correctly performed and properly sealed, the gauge will fail to work, and the connection between the sensor and the gauge may be degraded, resulting in the possible malfunction of that sensor, and possibly affecting operation of the internal combustion system. In addition, over time the splice connection might fail due to the constant vibrations within the automotive environment. The second common way to connect additional gauges is to add additional sensors to the automobile. Adding additional sensors is a complicated process, which involves mounting the sensor, connecting power to the sensor, and routing the wire to the new gauge. The skill that is required to perform this task is beyond that of many individuals.

Modern vehicles are generally equipped with numerous sensors, such as, for example, oil pressure, coolant temperature, transmission temperature, engine temperature, steering position, air/fuel ratio, etc. Typically, the sensors are connected to an on-board computer control module that continually monitors the sensors and regulates the vehicles functions accordingly. Generally the information generated by the sensor is continually passed along the vehicle data link as part of the vehicle diagnostic system. The vehicle diagnostic system cooperates with the factory installed gauge cluster to provide failure fault indications to the driver in the form of a "service engine" light. The vehicle diagnostic system typically includes one or more separate computer control modules. Examples of such computer control modules (also known as just "modules") are: a powertrain control module (PCM), an engine control module (ECM), a transmission control module (TCM), an anti-lock brake system (ABS) control module, and an air bag control module. Typically the computer control modules are connected together by a data link, forming the vehicle diagnostic system. The data link typically has a connection point, or data link connector (DLC) that is normally located under the dash of the vehicle. The vehicle diagnostic system is generally used to provide relevant information to repair technicians. The DLC provides repair technicians with a place to connect off-board vehicle diagnostic devices, such as scan tools and code readers for communication with the vehicle diagnostic system.

"Off-board devices," such as scan tools and code readers are known in the art. Scan tool and code reader testing devices interface with vehicle diagnostic systems to access, display, and/or print vehicle diagnostic information. On-Board Diagnostics Version II (OBD II) Scan Tools are one commonly known type of scan tool and are governed by a number of standards, e.g., SAE J1978 Rev. 1998-02, SAE J1979 Rev.

1997-09, ISO9141/KWP2000, CAN/ISO15765, SAE J1850 PWM, SAE J1850 VPW or the like.

A "Manufacturer-Specific Scan Tool" is a scan tool that accesses and displays proprietary manufacturer-specific data (and possibly also additionally accesses and displays OBD II data). Examples of proprietary manufacturer-specific data include Device Controls on General Motors, On-Demand Tests in Ford, Actuator Tests, Sensor Tests, Interrogator, and Read Temporary Codes in Chrysler. In general, air bag data, ABS data, cruise control data, and climate control data are also considered to be proprietary manufacturer-specific data and are typically included only in Manufacturer-Specific Scan Tools.

Typically, scan tools are capable of performing at least some of the following major functions: "View Data," also known as "Live Data," "Data," and "Data Test, DTC" (viewing and displaying in real-time live changing data from a plurality of module sensors), display of textual diagnosis descriptions corresponding to the various diagnostic codes, recording and playback of data, device control (manually controlling modules for diagnostic purposes), and reading and displaying vehicle information from the vehicle's computer (e.g., VIN information, controller calibration identification number, etc.).

However, the scan tools are often large, cumbersome wheeled devices that set outside of the vehicle with cables extending into the vehicle. Portable scan tool devices are also known, these devices are generally not constructed for permanent installation within a vehicle; nor are they generally equipped for connection to, and collection of data from, peripheral devices.

Therefore, there exists a need for a display device that collects information from multiple busses and senders, and can display the information on the screen of the display in a user configured format. The device should also be capable of recording the signals received from the busses and senders as well as signals from peripheral devices simultaneously to single or multiple file(s) with matching timestamps. The system should be configured so that the user can design his/her own gauge displays "skins" in the form of graphics, graphs, fonts, needles, buttons, program generated objects, and backgrounds. The system should store multiple user created skins which can be recalled for use by the user. The system should also allow the user to reassign a gauge skin to a different signal received from one of the busses or peripheral devices. The system should also be configured for automatic skin changes in response to ambient light conditions. The system should also be configured to change background color, font size and shape, and sound alarms or signals based on the signal values being received from the busses. The system should be capable of displaying data from multiple busses and peripheral devices simultaneously on the same display. The system should be configured for bi-directional communication with the vehicle's on-board computer(s) for diagnostics as well as reprogramming of the on-board computer(s). The system should be configured to integrate with or function as a GPS. The system should also be configured to store and display a commercial that illustrates the functions and capabilities of the device.

Thus, the present invention provides a gauge display system which overcomes the disadvantages of prior art scanners and gauges. The gauge display system of the present invention not only provides for relative ease in installation of the system, it also permits customization of the display/interface as well as connectivity to peripheral devices.

SUMMARY OF THE INVENTION

Briefly, the present invention is directed toward a data acquisition and display system for vehicles that connects to the vehicle's on-board computer(s) via a data link connector (DLC). The system includes a display module suitable for permanent or temporary attachment within the interior of a vehicle. The display module preferably includes a full color monitor that also functions as a touch screen for inputting commands to the computer within the display module. The computer includes a suitable processor, operating system, software and tangible data storage media to allow multiple user configurable functions. The display module collects information from the vehicle via multiple busses and senders through the data link connector and displays the information on the screen of the display module in a user configured format. The direct connection between the display module and the data link facilitates bi-directional communication with the vehicle's on-board computer(s) for diagnostics as well as reprogramming of the on-board computer(s) which may be accomplished in real-time.

The system is configured so that the user can design his/her own gauge displays "skins" in the form of graphics, graphs, fonts, needles, buttons, program generated objects, and backgrounds that can be stored and recalled for display on the display module monitor. Input signals from the various sensors within the vehicle can be assigned and reassigned to a specific gauge skin or to a specific display contained within a gauge skin.

As a safety feature, the system can be configured for automatic skin changes in response to ambient light conditions and may additionally change background color, font size and shape, and/or sound alarms based on the signal values being received from the busses. The system is also capable of displaying data from multiple busses and peripheral devices simultaneously on the same display. Alternatively, the data can be stored on the permanent or removable memory of the device with timestamps so that the data can be recalled and viewed simultaneously on the display module monitor.

In addition, the system includes multiple communication ports configured for attachment to peripheral devices such as cameras, GPS, accelerometers, sensors and the like. The system may also include a wireless connection, such as Bluetooth or the like, that may be utilized for connection to peripheral devices or sensors positioned within the vehicle.

The device also includes a computer readable medium (permanent or removable memory) suitable for recording the signals received from the busses and senders, as well as signals from peripheral devices, simultaneously to single or multiple file(s) with matching timestamps. This construction allows data from sensors in the vehicle to be recalled and viewed in combination with data from a peripheral device such as a video camera on the monitor. This arrangement can be extremely helpful to car enthusiasts that wish to improve performance in competition settings. Moreover, the system is configured to integrate with a GPS. The GPS information can be evaluated in conjunction with the sensor data and/or other peripheral device data for performance enhancement or positional awareness and may be used in a manner similar to that of a flight recorder, whereby data relating to throttle position, steering angle, braking and the like may be utilized for accident reconstruction.

Still yet, the combination of the processor and storage media in the display module permits promotional information to be stored, recalled and displayed on the monitor within a retail store for promotion of the display system.

Accordingly, it is an objective of the present invention to provide a data acquisition and display system for communicating with the on-board computer(s) of a vehicle that includes a computer processor, software and computer readable storage for operator configured display of the data received from the vehicle.

It is a further objective of the present invention to provide a data acquisition and display system that provides bi-directional communication between the gauge display system and the on-board computer(s) of the vehicle.

It is yet a further objective of the present invention to provide a data acquisition and display system that, in addition to cooperating with the on-board computer(s), cooperates with peripheral devices for acquisition of data which can be combined.

It is another objective of the instant invention to provide a data acquisition and display system that includes a touch screen for control of gauge face graphic designs, communication with the on-board computer(s), and control of peripheral devices.

It is yet another objective of the instant invention to provide a data acquisition and display system that includes automatic power-up and power-down modes to conserve vehicle power.

It is still another objective of the instant invention to provide a data acquisition and display system that integrates with at least one on-board computer and/or functions as a GPS.

It is still yet another objective of the instant invention to provide a data acquisition and display system that displays sensor outputs received from an on-board computer in a user configured graphics display.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENTS

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring generally to the figures, the present invention is directed toward a data acquisition and display device 10 for vehicles 12 that connects to the vehicle's on-board computer (s) 14 via a data link connector 16. The system includes a display module 20 suitable for permanent or temporary attachment within the interior of a vehicle. The display module preferably includes a full color display monitor 22 in electrical connection with the display computer 18 for bi-directional electrical communication therebetween. In a most preferred embodiment, the display monitor functions as a touch screen for inputting commands to the display computer 18 regarding the information to be displayed and the graphics associated with the display. The display computer 18 includes a suitable processor 24, operating system, software and tangible data storage media in the form of Random Access Memory (RAM) 26 to allow multiple user configurable displays and functions. In the preferred embodiment, the processor is an ARM9 manufactured by ATMEL. However, it should be noted that other processors suitable for communicating with the on-board computer(s) and operation of the display monitor 22 could be utilized without departing from the scope of the invention. The operating system is preferably LINUX, however other operating systems well known in the art are also contemplated to be within the scope of the invention. The operating system and DASHDAQ software are preferably stored on the RAM 26 storage media or alternatively on the removable memory 28, which is preferably a compact flash card or the like. In a most preferred embodiment, the removable memory provides up to 16 GB of data storage suitable for storing software as well as recording the data received from the on-board computer or the peripheral devices. Connection to the removable memory 28 is provided through the removable memory port 29 which is in electrical communication with the processor 24.

The display module 20 includes at least one vehicle connection port 30 in electrical connection with the display computer 18. A data link connector 16 extends between the vehicle connection port 30 and at least one on-board computer 14 positioned within the vehicle for bi-directional electrical communication of data relating to the various operating systems within the vehicle including, but not limited to, the powertrain control module (PCM), the engine control module (ECM), the transmission control module (TCM), the anti-lock brake system (ABS) control module, and the air bag control module.

The display module 20 collects information from the vehicle via multiple busses and sensors through the data link connector 16 which is connected to the On-Board Diagnostics Version II (OBD II) connection and displays the information on the screen of the display module in a user configured format. The direct connection between the display module and the on-board computer(s) facilitates bi-directional communication for receiving sensor data, diagnostics of vehicle systems as well as reprogramming of the on-board computer(s) for performance applications or troubleshooting.

The display module includes at least one peripheral input port 32 in electrical communication with the display computer for electrical communication with at least one peripheral device. Peripheral devices may include, but should not be limited to digital cameras, accelerometers, GPS and sensors. Digital cameras are understood to include both still and video cameras.

In the preferred embodiment, the computer readable memory carrier 26, 28 is constructed and arranged for storage of data received from one or more peripheral device(s). The display computer attaches a timestamp to the data received and stored by the computer readable carrier. In this manner the on-board computer data and the peripheral device data may be recalled and viewed simultaneously. The data from the different sources can be displayed on a single screen with matching timestamps. In this manner, data from sources such as a camera 34, vehicle speed from a GPS sensor, steering angle from the vehicle's computer bus, brake temperature from a wired sensor and wireless connection to an accelerometer can be recalled and viewed simultaneously on a user designed skin. The wireless connection to a remote device 36 may be accomplished through one of the USB 2.0 peripheral input ports 32 via a Bluetooth or 802.11b/g connection. While an analog sensor 40 may be directly connected to analog input port 33.

Figure 1:
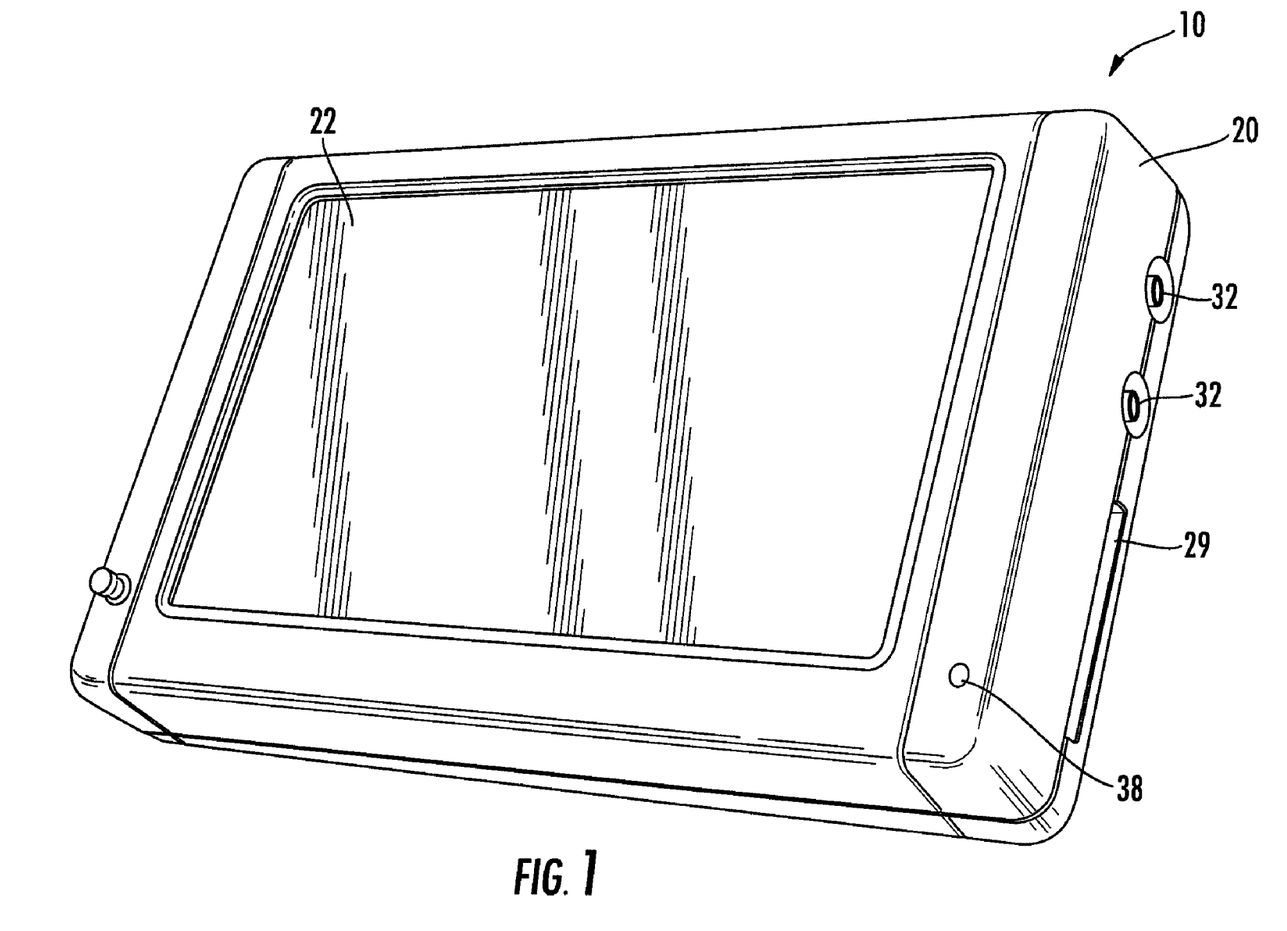
FIG. 1 is a top perspective view of one embodiment of the instant invention.
Figure 2:
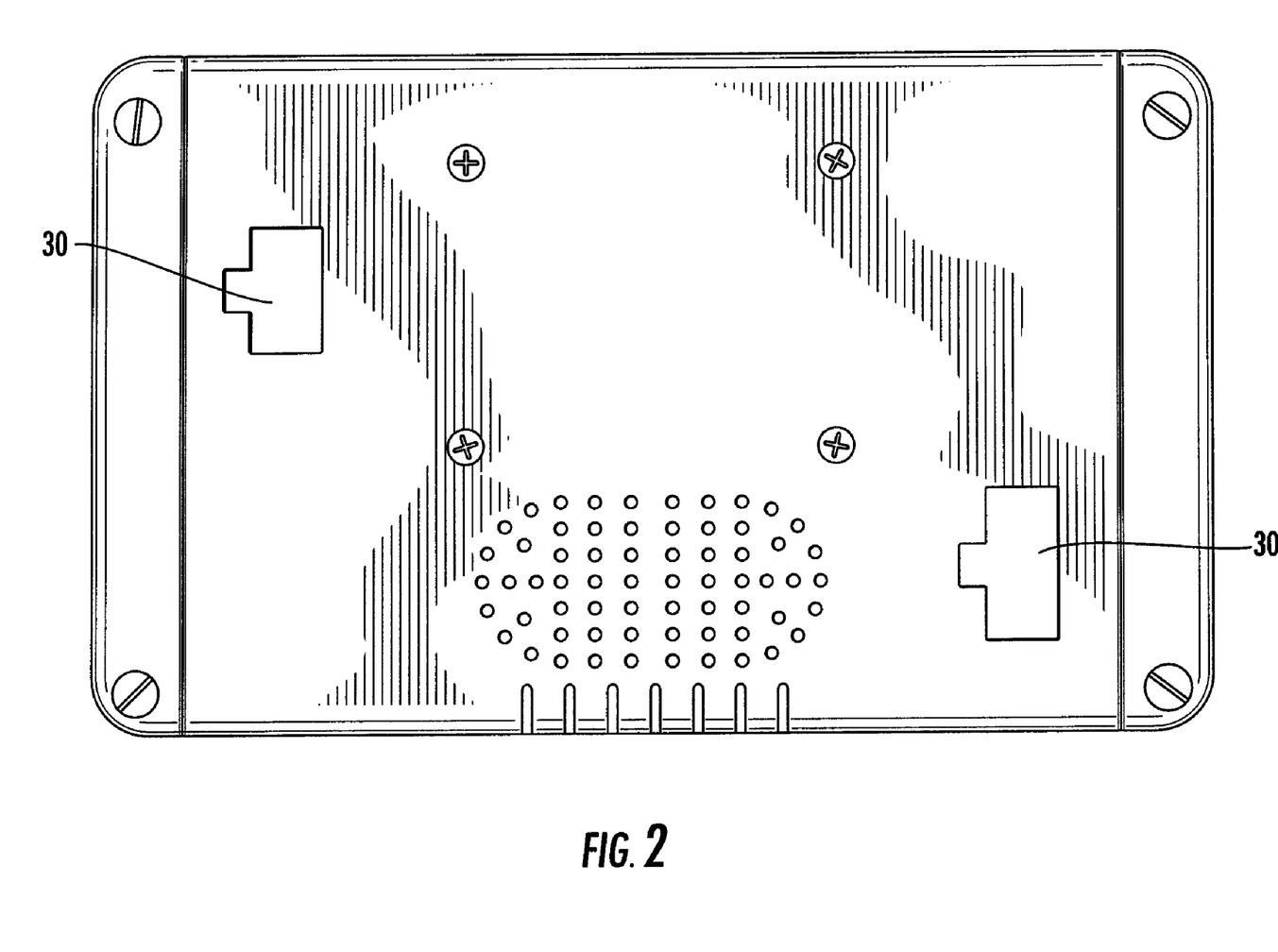
FIG. 2 is a rear view of the embodiment shown in FIG. 1.
Figure 3:
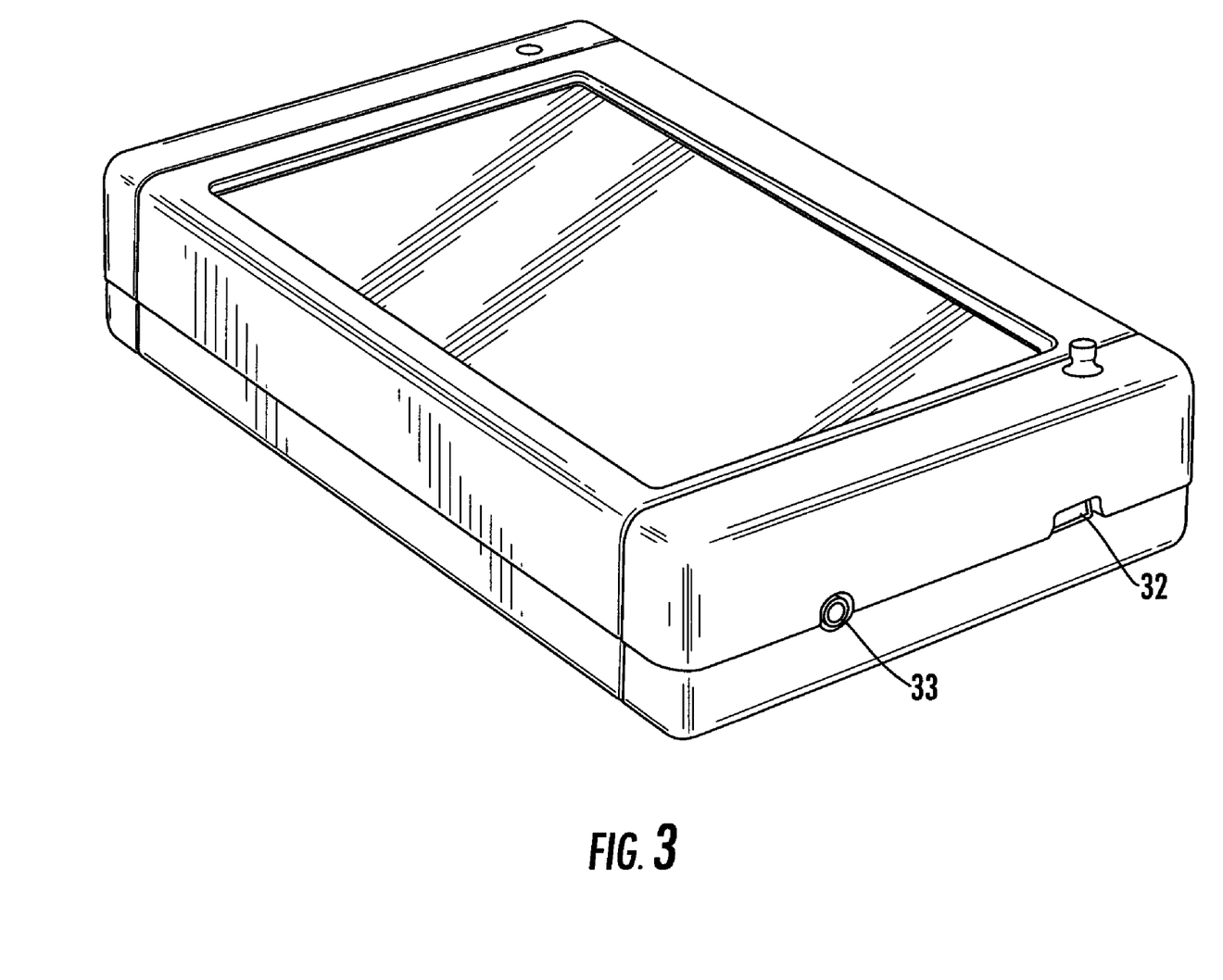
FIG. 3 is a top perspective view of the embodiment shown in FIG. 1 illustrating connection ports.
Figure 4:
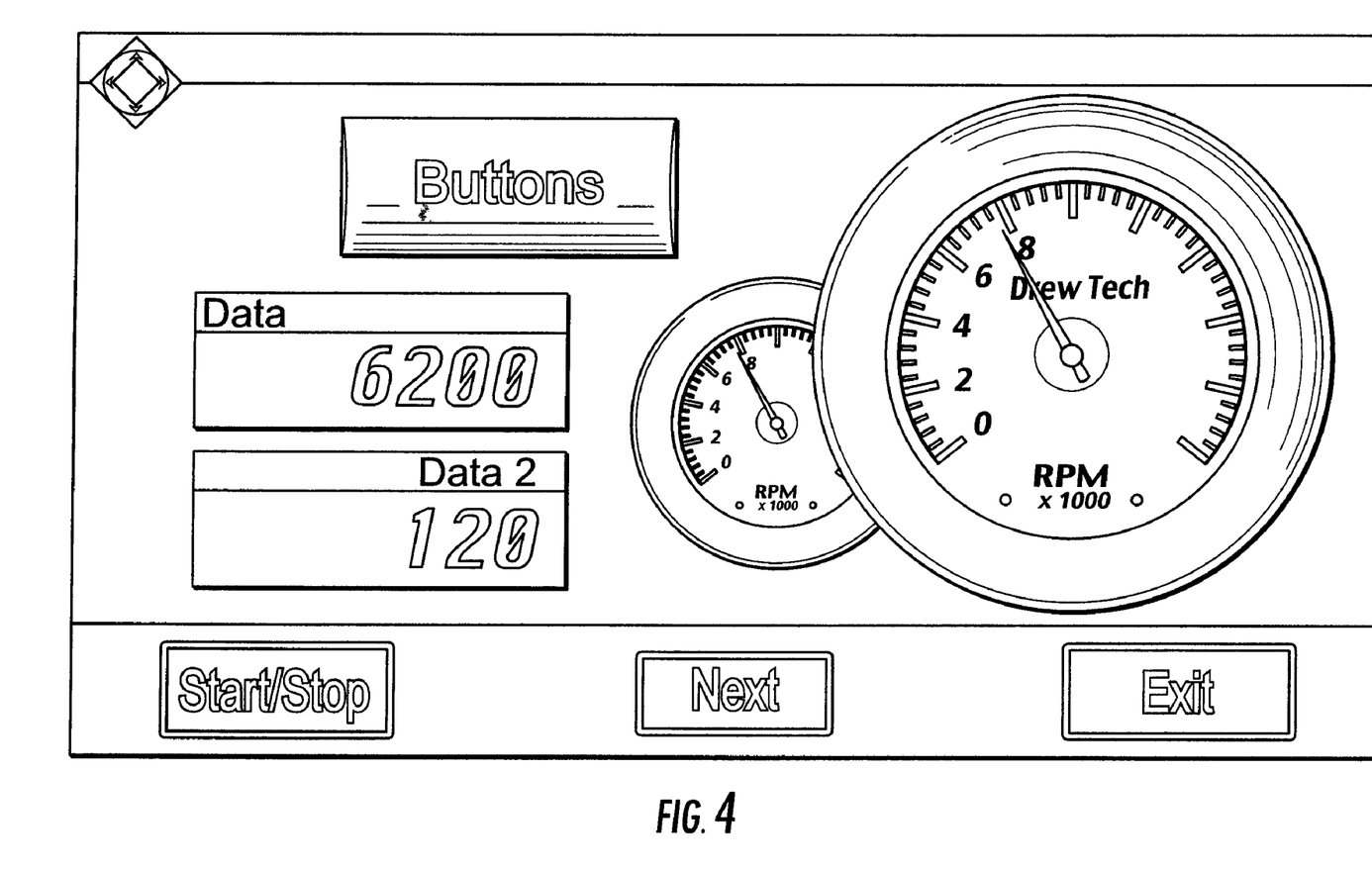
FIG. 4 is a front view illustrating a gauge skin representative of data received from the on-board computer(s) as well as data received from a peripheral device.
Figure 5:
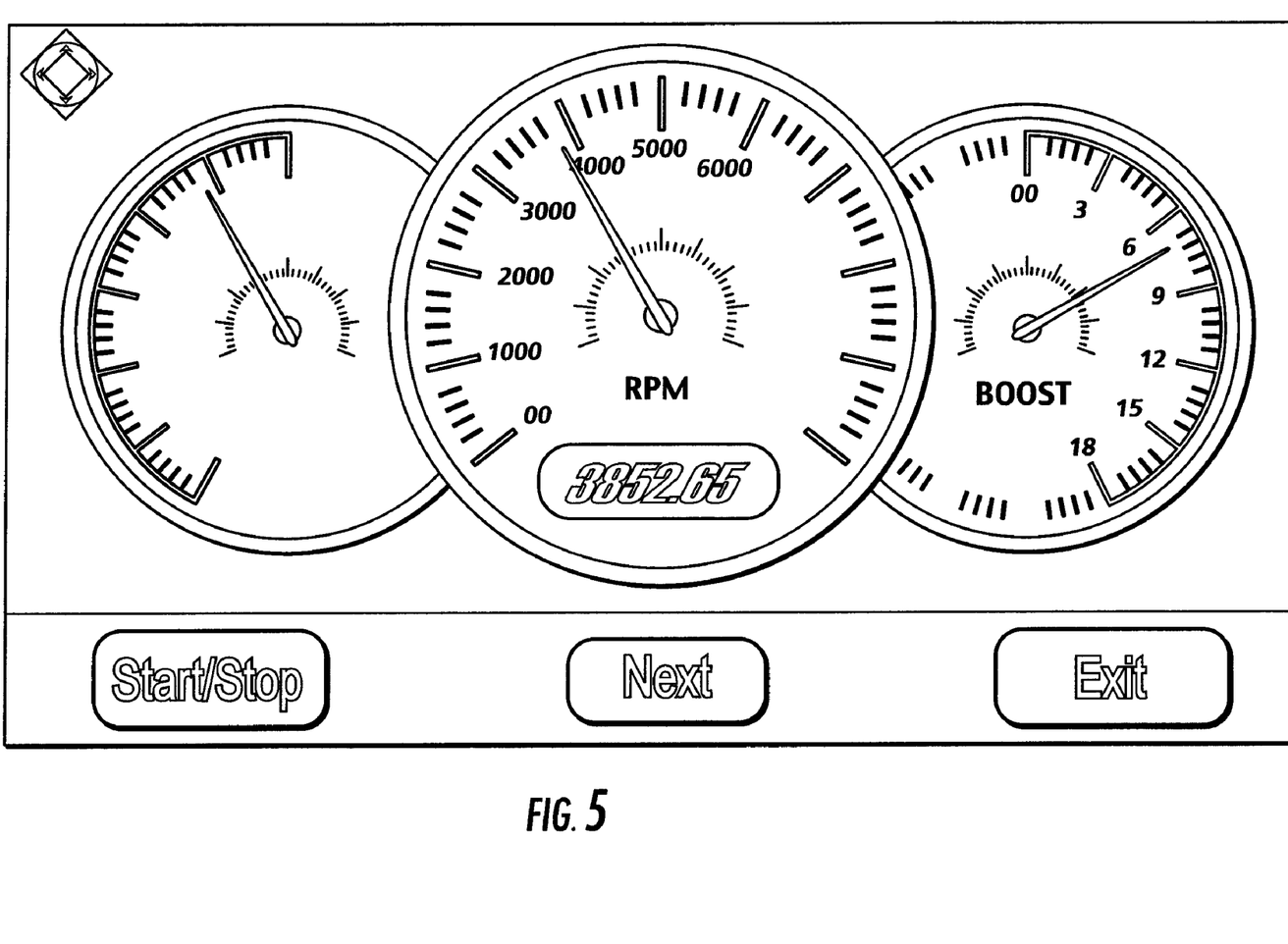
FIG. 5 is a front view illustrating a user configured gauge skin for displaying engine information.
Figure 6:
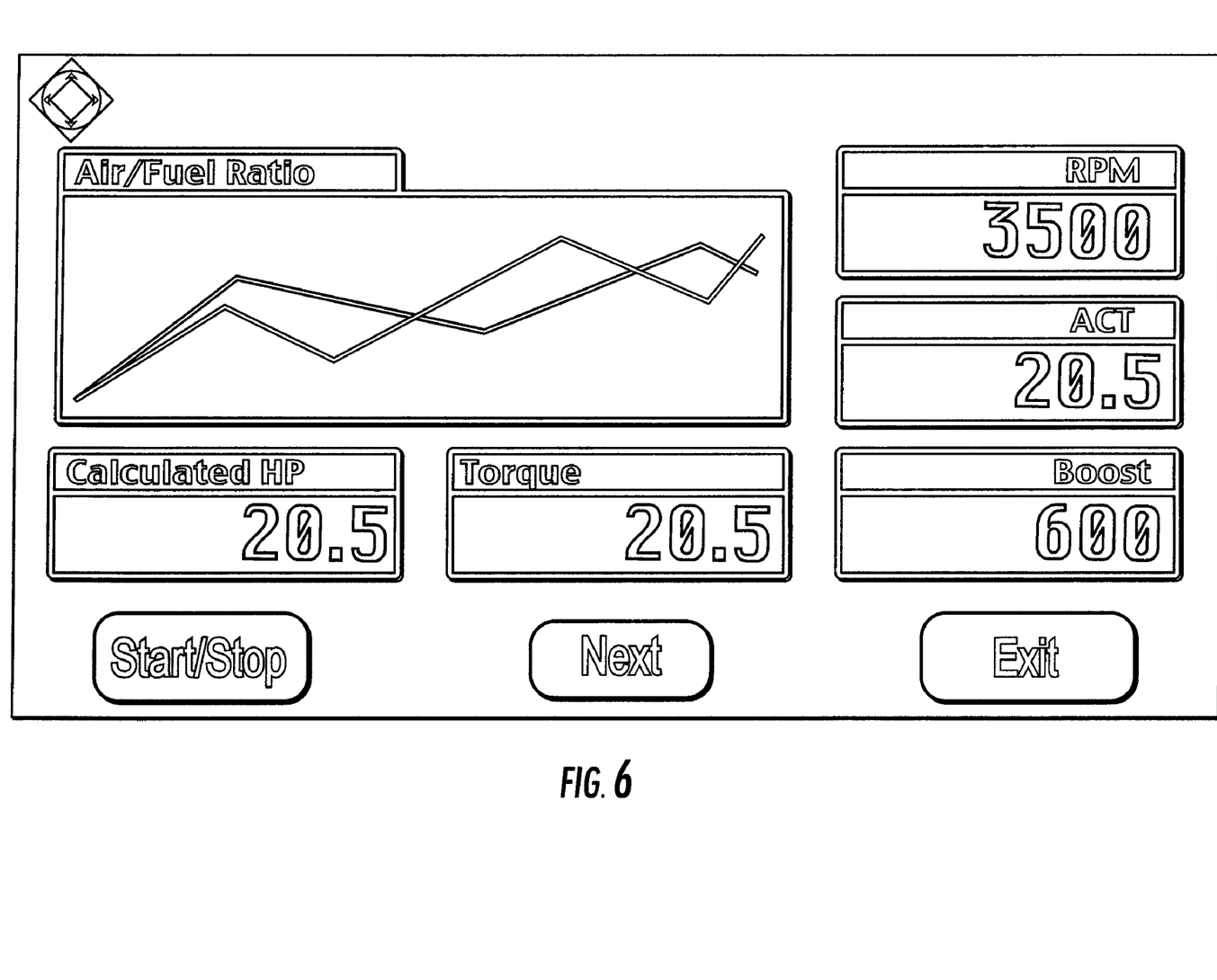
FIG. 6 is a front view illustrating a gauge skin including graphical as well as digital information.
Figure 7:
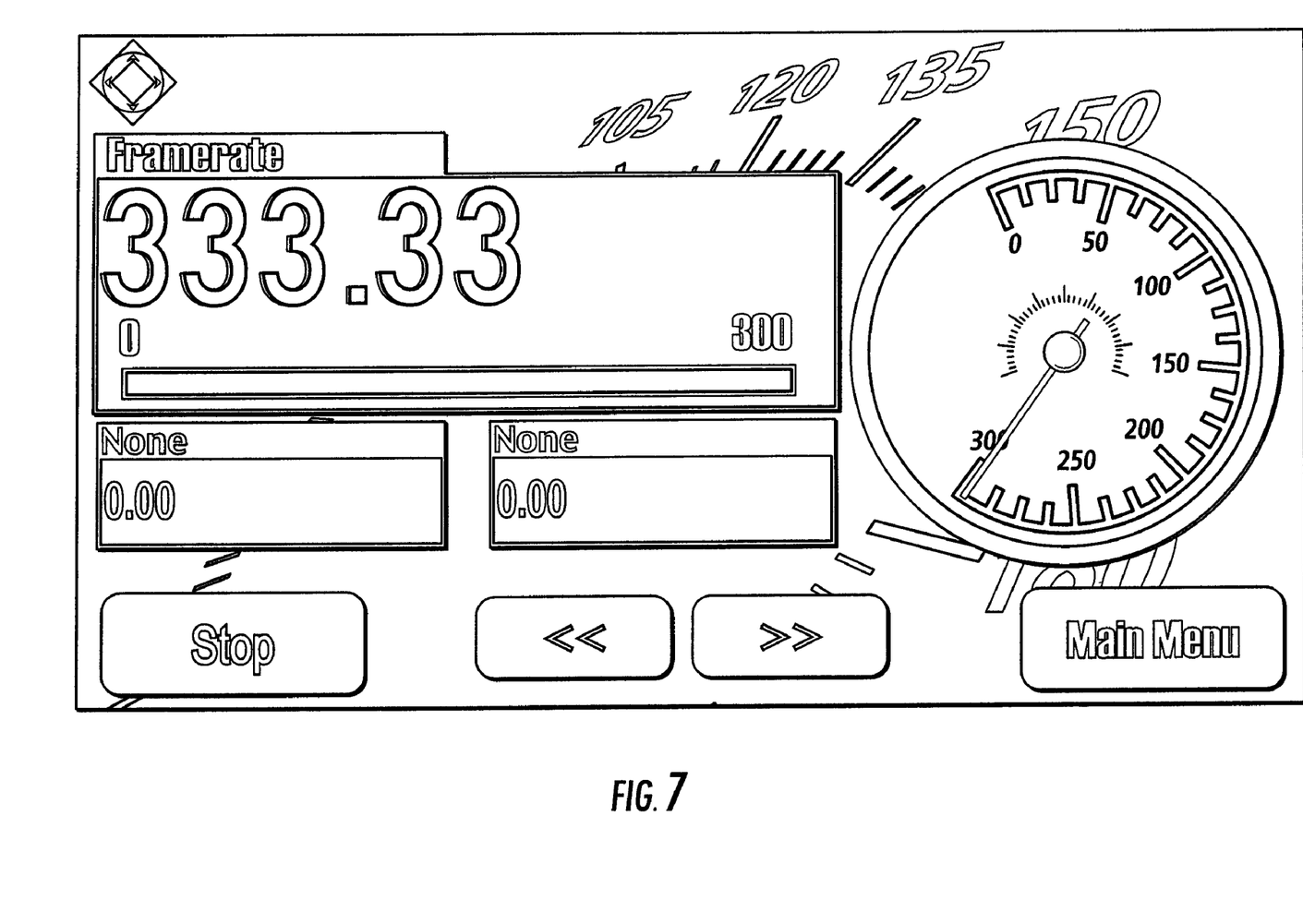
FIG. 7 is a front view illustrating a gauge skin including digital as well as an analog gauge representation.
Figure 8:
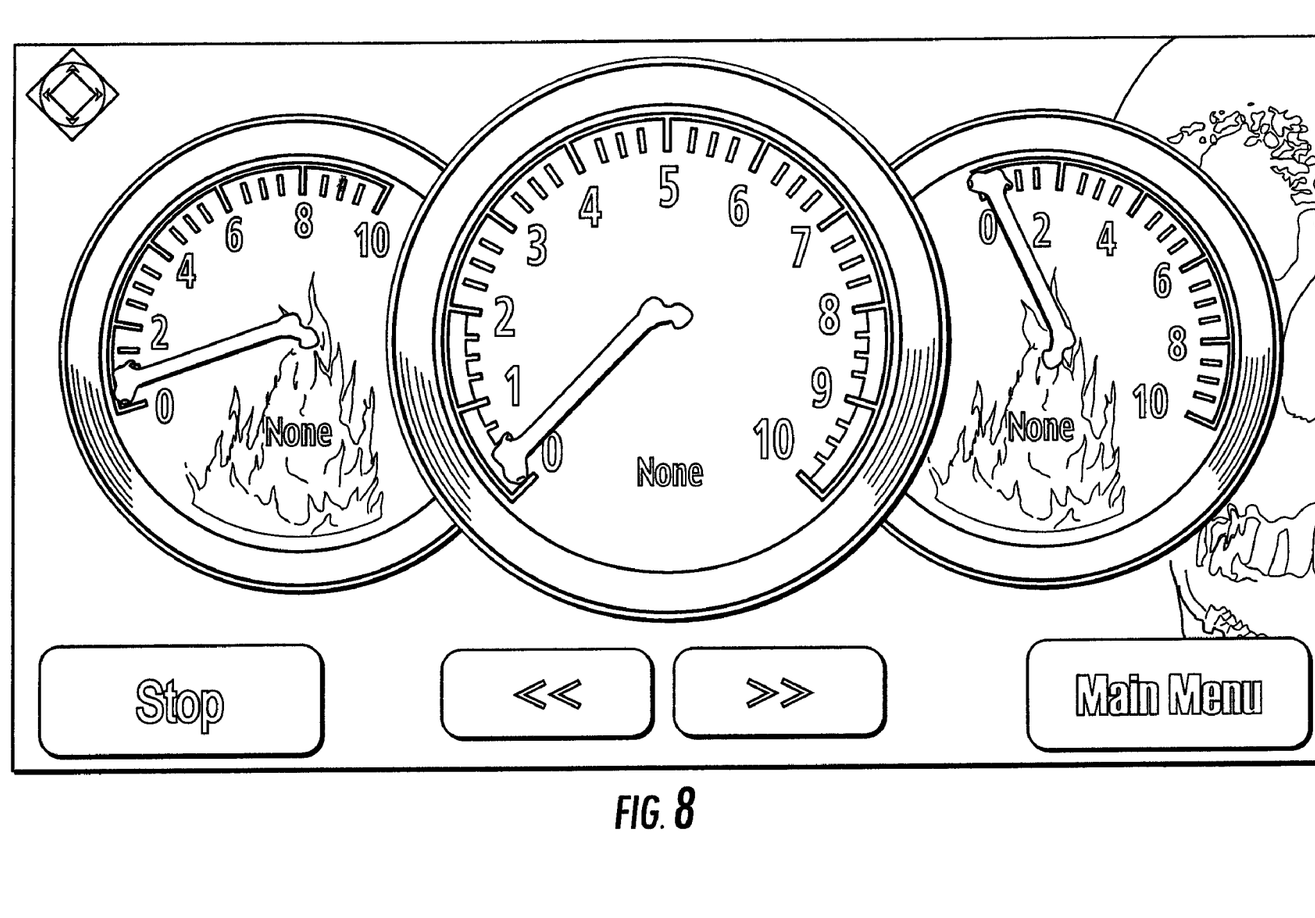
FIG. 8 is a front view illustrating a gauge skin configured with the instant invention.
Figure 9:
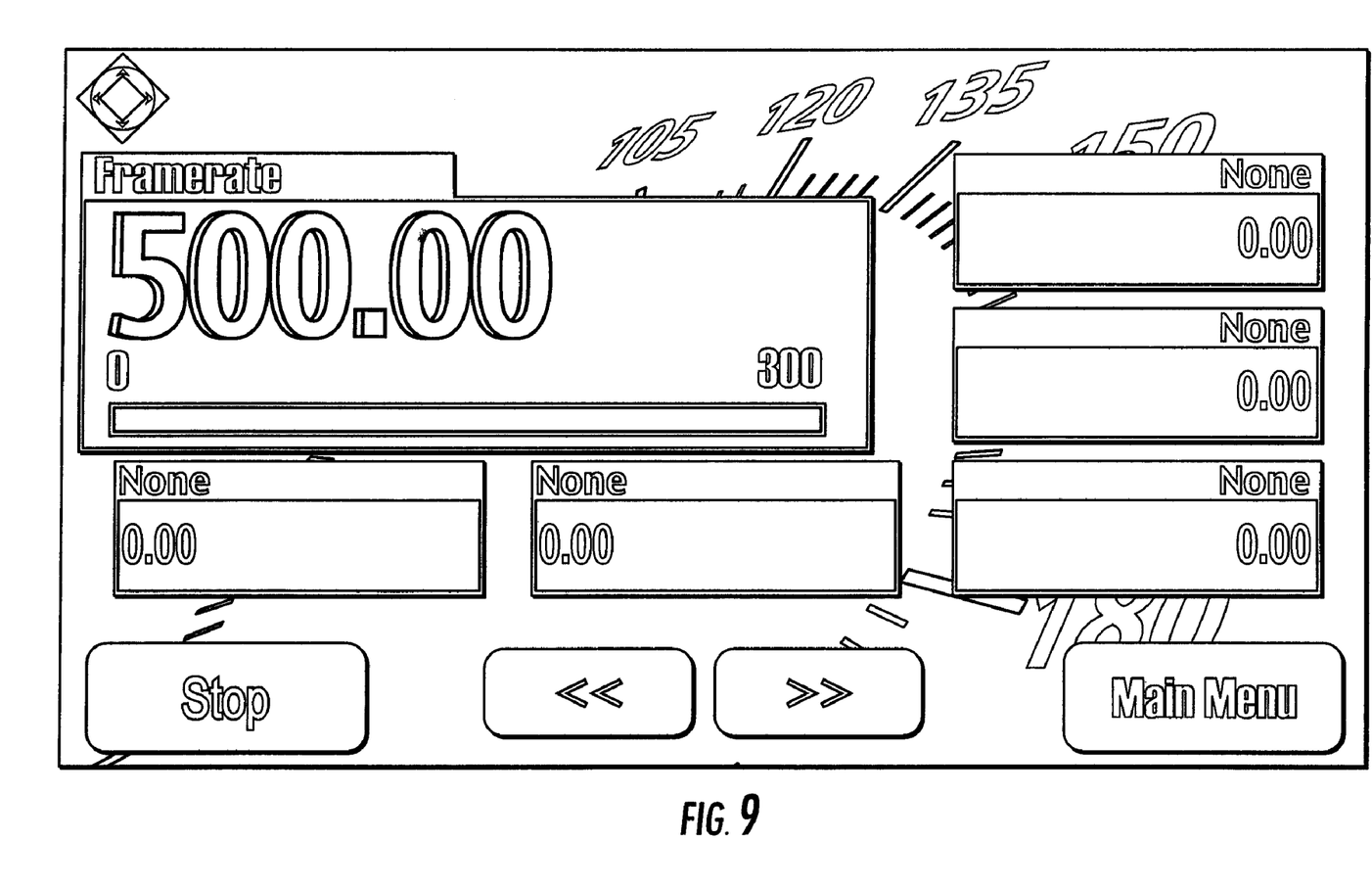
FIG. 9 is a front view illustrating a gauge skin configured with the instant invention.
Figure 10:
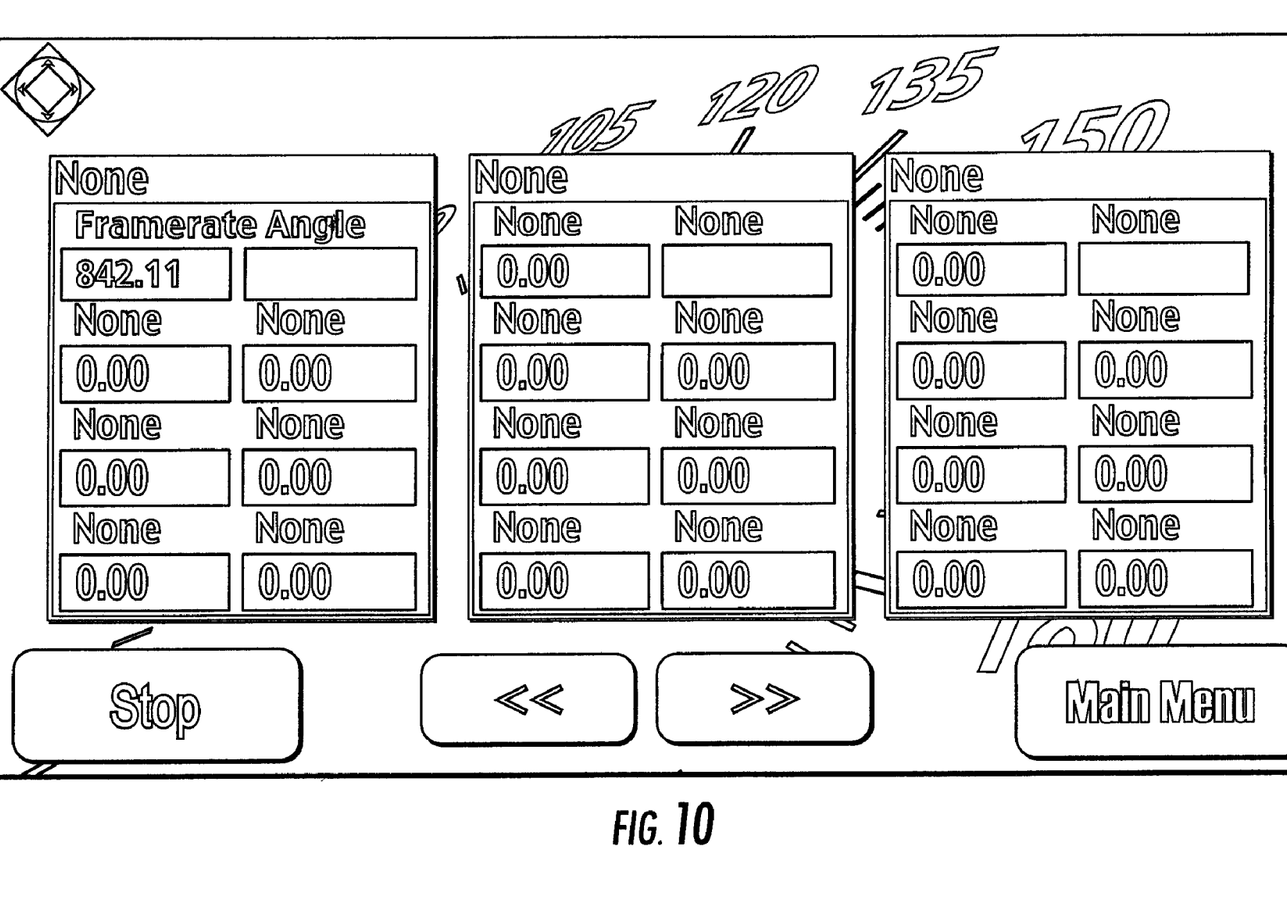
FIG. 10 is a front view illustrating a gauge skin configured with the instant invention.
Figure 11:
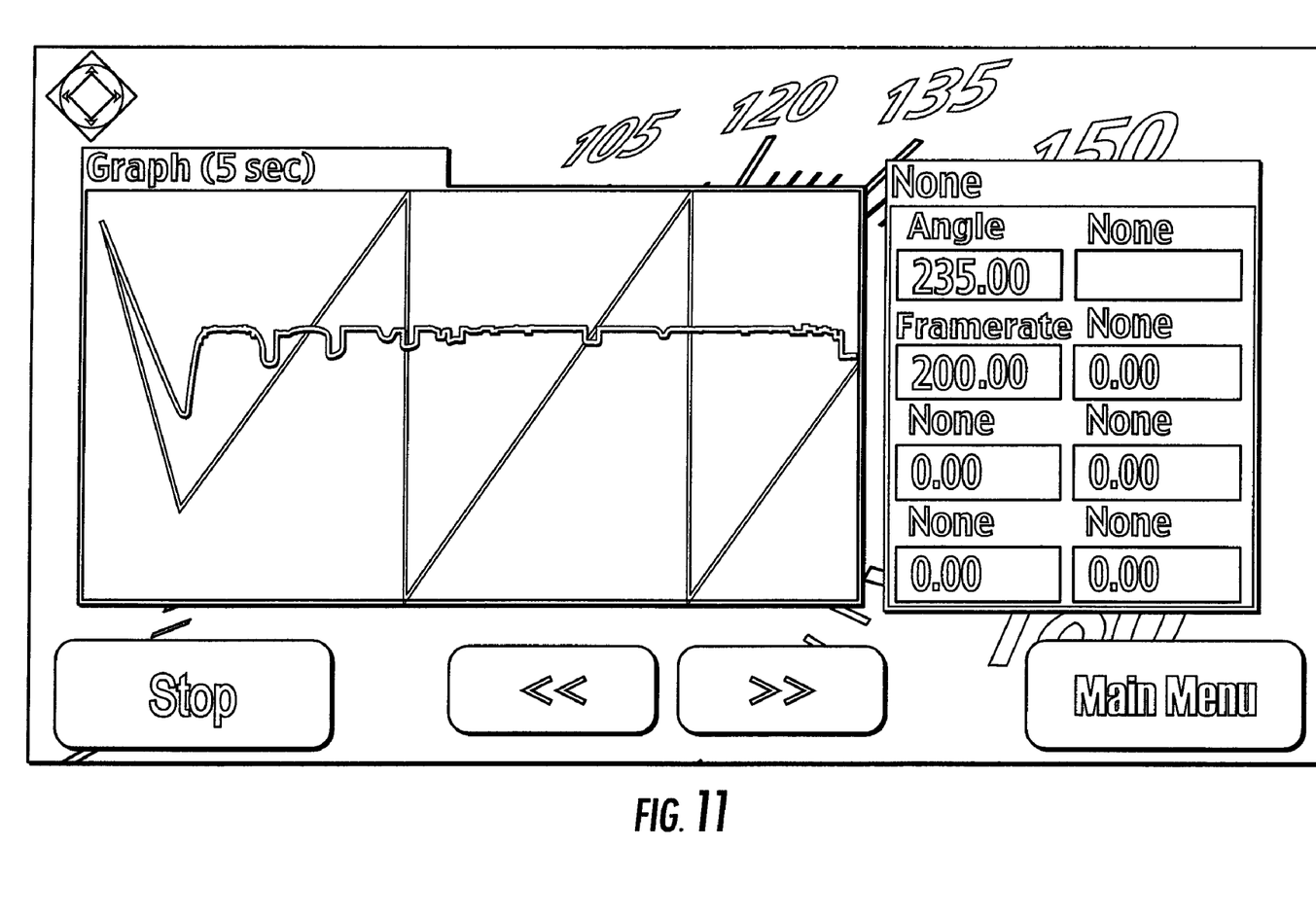
FIG. 11 is a front view illustrating a gauge skin configured with the instant invention.
Figure 12:
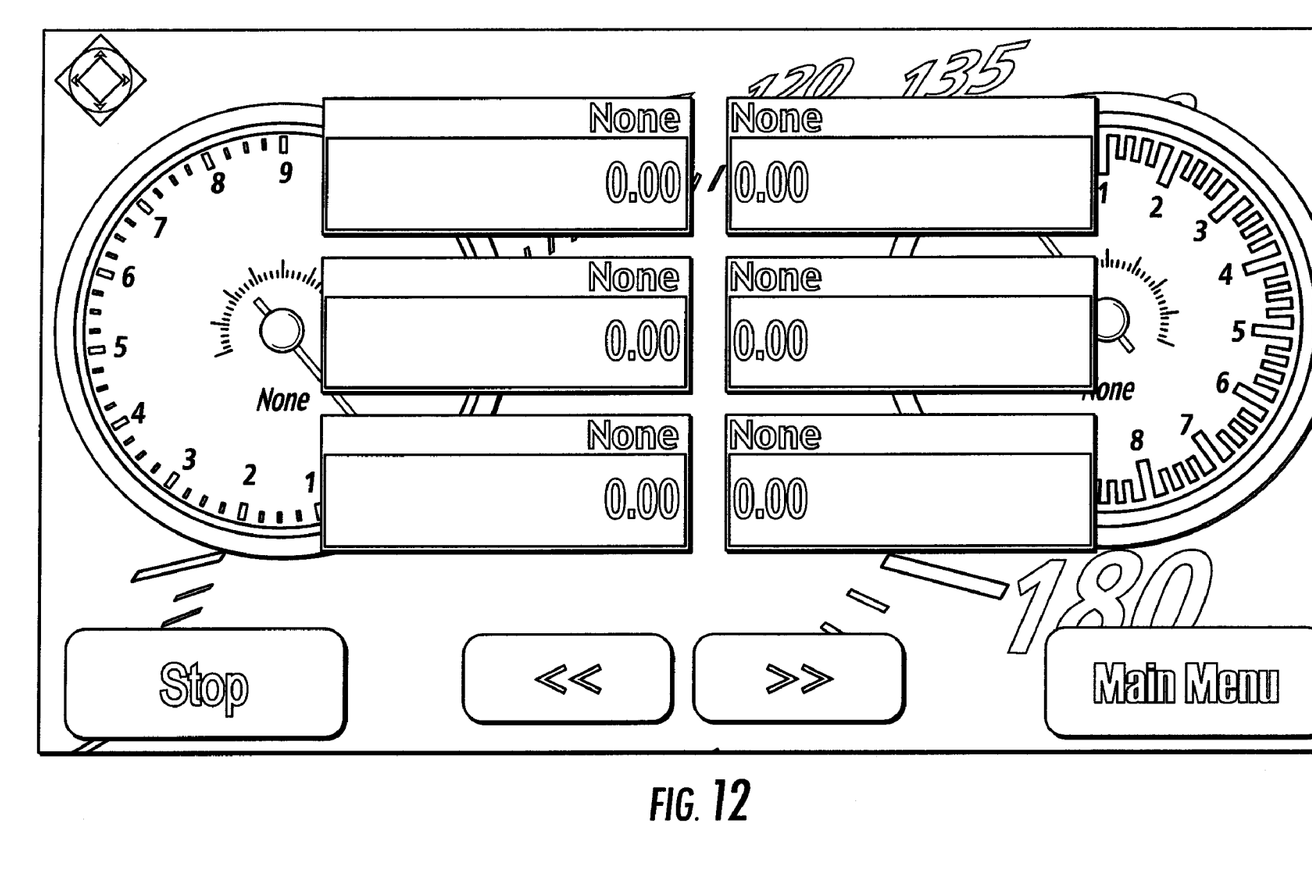
FIG. 12 is a front view illustrating a gauge skin configured with the instant invention.
Figure 13:
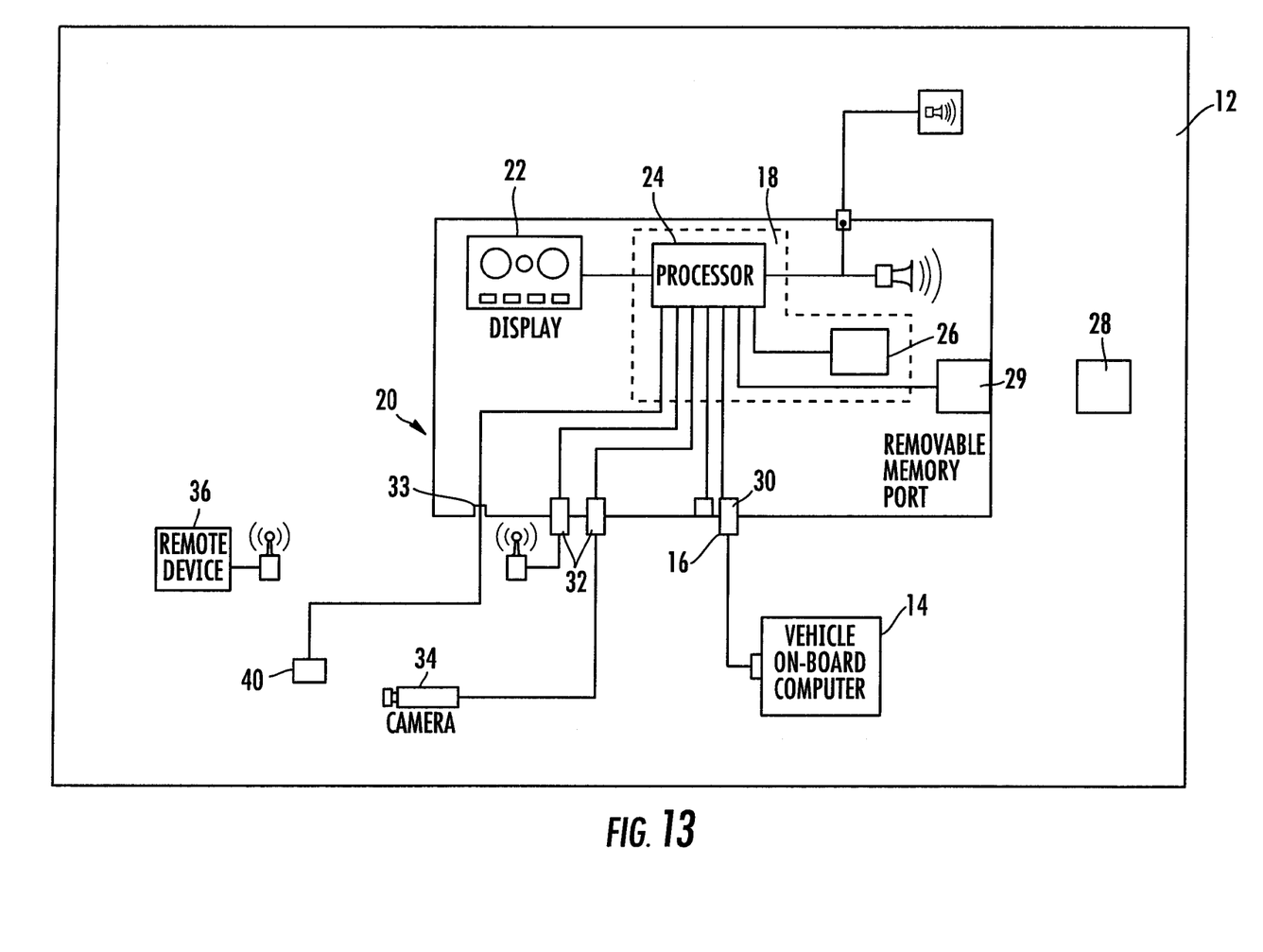
FIG. 13 is a schematic representation of one embodiment of the instant invention.

Referring to FIGS. 4-12, the DASHDAQ software is configured to take input commands from the touch screen monitor 22 so that the user can design his/her own gauge displays "skins" which may include, but should not be limited to, graphics, graphs, fonts, needles, buttons, program generated objects, and backgrounds that can be stored and recalled for display on the monitor. Input signals from the various sensors within the vehicle can be assigned and reassigned to a specific gauge skin or to a specific display contained within a gauge skin.

As a safety feature, the system includes a daylight sensor 38 which can be configured for automatic skin changes in response to ambient light conditions. The system also includes a feature wherein the display may change background color, flash, change the display within a gauge skin, font size and shape, and/or sound alarms based on the signal values being received from the busses. These signals values represent vehicle parameters which are outside of desired and normal operational limits. For example, if the engine RPM exceeds the manufactures limit, if the temperature of the cooling water is too high, if the oil pressure in the engine is too low, etc.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objects and obtain the ends and advantages mentioned, as well as those inherent therein. Any compounds, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A data acquisition and display system for displaying operator configurable information within a motor vehicle comprising:

a display module constructed and arranged to be secured within the interior of said motor vehicle, said display module including a display computer and a display monitor in electrical communication with each other, said display module including at least one vehicle connection port in electrical connection with said display computer, a data link connector extending between said vehicle connection port and at least one on-board computer positioned within said motor vehicle for bi-directional electrical communication of data relating to said motor vehicle, said display computer including software constructed and arranged for operator configuration of said display computer regarding the delivery of instructions to said display monitor for display of an operator configured visual image relating to data received from said on-board computer on said display monitor, said display monitor simultaneously displaying at least two operator configured visual images relating to data received, the position of each of said at least two operator configured visual images on said display monitor being repositionable relative to other operator configured images on said display monitor.

2. The data acquisition and display system of claim 1 wherein said display module includes at least one peripheral input port in electrical communication with said display computer for electrical communication with at least one peripheral device, said software constructed and arranged for operator configuration of said display computer regarding the delivery of instructions to said display monitor for display of an operator configured visual image relating to data received from said peripheral device on said display monitor.

3. The data acquisition and display system of claim 1 wherein said peripheral device is a digital camera.

4. The data acquisition and display system of claim 1 wherein said peripheral device is an accelerometer.

5. The data acquisition and display system of claim 1 wherein said peripheral device is a global positioning system.

6. The data acquisition and display system of claim 1 wherein said display module includes a physical computer readable carrier constructed and arranged for storage of data received from said on-board computer, whereby said data may be selectively recalled and replayed on said monitor.

7. The data acquisition and display system of claim 6 wherein said computer readable carrier is constructed and arranged for storage of data received from said at least one peripheral device.

8. The data acquisition and display system of claim 7 wherein said display computer attaches a timestamp to said data received and stored by said computer readable carrier, whereby said on-board computer data and said peripheral device data may be recalled and viewed simultaneously.

9. The data acquisition and display system of claim 1 wherein said monitor is a touch screen constructed and arranged for inputting commands to said display computer.

10. The data acquisition and display system of claim 1 wherein said operator configured visual image is selected from the group consisting of graphics, graphs, fonts, needles, buttons, program generated objects and backgrounds.

11. The data acquisition and display system of claim 1 wherein display computer is constructed and arranged to automatically change said visual image based on ambient light conditions within the motor vehicle.

12. The data acquisition and display system of claim 1 wherein display computer is constructed and arranged to automatically change said visual image based on signals received from said on-board computer.

13. The data acquisition and display system of claim 2 wherein said peripheral device communicates with said peripheral device port via wireless connection.

14. The data acquisition and display system of claim 13 wherein said wireless connection utilizes a Bluetooth protocol.

15. The data acquisition and display system of claim 1 wherein said display computer and said software are constructed and arranged for operator configuration of said on-board computer regarding at least one operational parameter of a vehicular system controlled by said on-board computer.

16. The data acquisition and display system of claim 6 wherein said computer readable carrier is constructed and arranged to store a commercial in a digital format illustrating the features of said display system on said monitor, whereby said commercial may be played in a loop to promote said display system in a commercial setting.

17. The data acquisition and display system of claim 1 wherein said data received from said on-board computer is vehicle diagnostic data.

18. The data acquisition and display system of claim 1 wherein display computer is constructed and arranged to automatically change said visual image or emit an audio sound based on signals received from said on-board computer, said signals represent vehicle operating parameters outside of preset limits.

19. A data acquisition and display system for displaying operator configurable information within a motor vehicle comprising:

a display module constructed and arranged to be secured within the interior of said motor vehicle, said display module including a display computer and a display monitor in electrical communication with each other, said display module including at least one vehicle connection port in electrical connection with said display computer, a data link connector extending between said vehicle connection port and at least one on-board computer positioned within said motor vehicle for bi-directional electrical communication of data relating to said motor vehicle, said display module includes a physical computer readable carrier constructed and arranged for storage of data received from said on-board computer pertaining to said at least one on-board computer, said data being selectively recalled and displayed on said display monitor, said display computer including software constructed and arranged for configuration of said display computer regarding the delivery of instructions to said display monitor for display of a configured visual image relating to data received from said on-board computer on said display monitor, said display computer attaching a timestamp to said data received and stored by said computer readable carrier, whereby said on-board data may be recalled and viewed simultaneously.

20. The data acquisition and display system for displaying operator configurable information within a motor vehicle of claim 19 wherein physical computer readable carrier is constructed and arranged for storage of data received from at least one peripheral device, whereby said on-board computer data and said peripheral device data may be recalled and viewed simultaneously on said monitor.

* * * * *